Sept. 2, 1969                    W. G. ANDERS                    3,464,750
                    TRAY-RETAINER CONSTRUCTION FOR POWER FILES
Filed Nov. 13, 1967                                         4 Sheets-Sheet 2
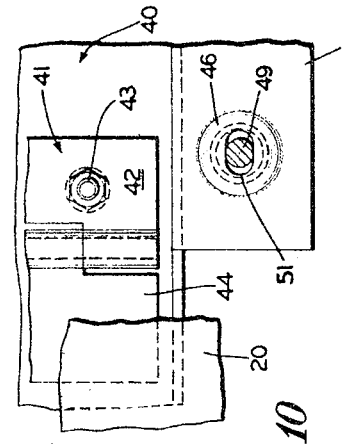
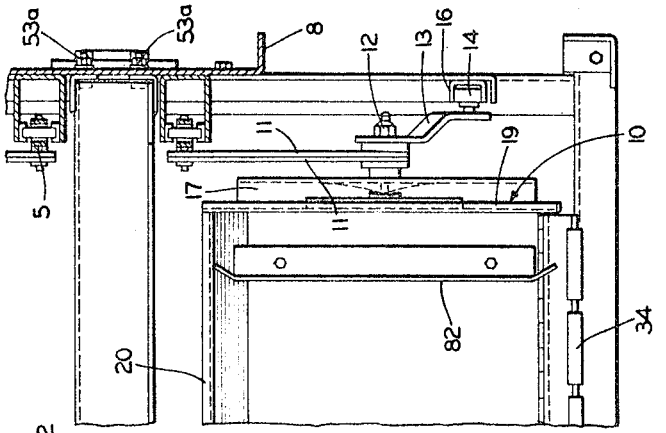
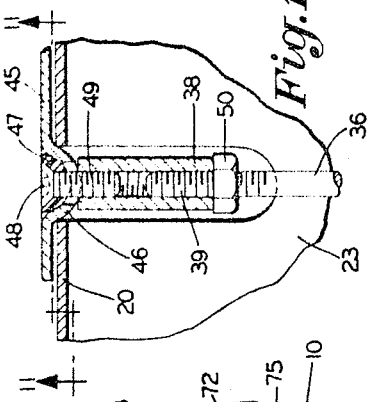
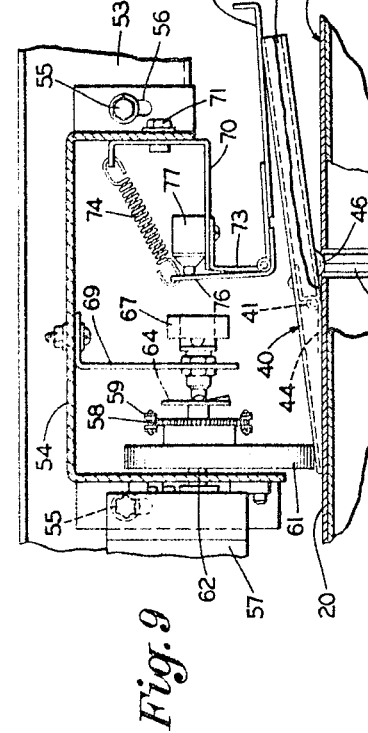
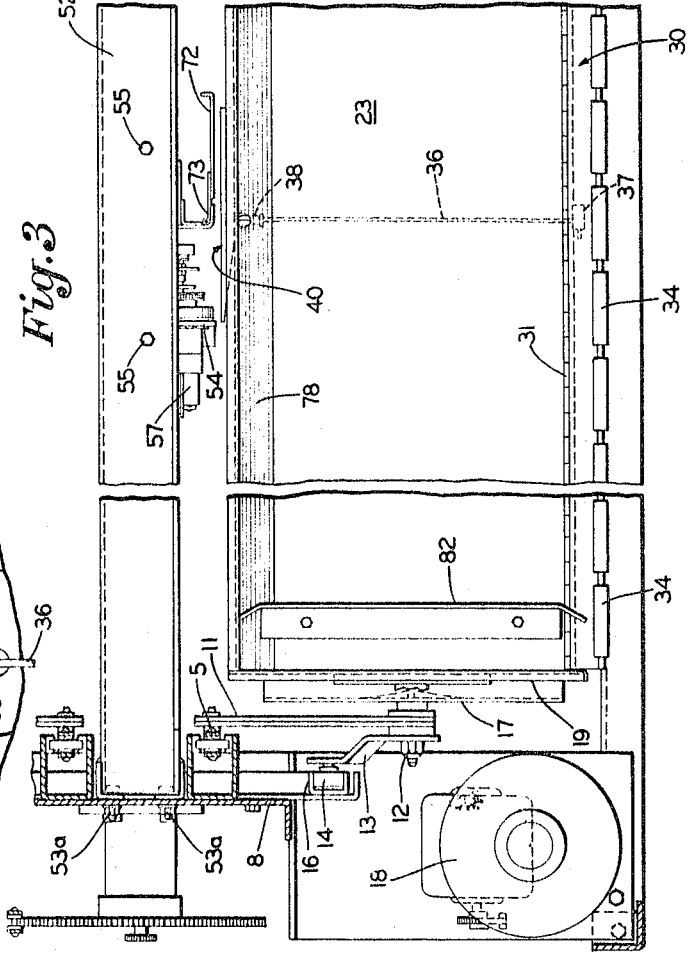
INVENTOR.
*Walter G. Anders*
BY
*Frease & Bishop*
ATTORNEYS Sept. 2, 1969  W. G. ANDERS  3,464,750
TRAY-RETAINER CONSTRUCTION FOR POWER FILES
Filed Nov. 13, 1967  4 Sheets-Sheet 3

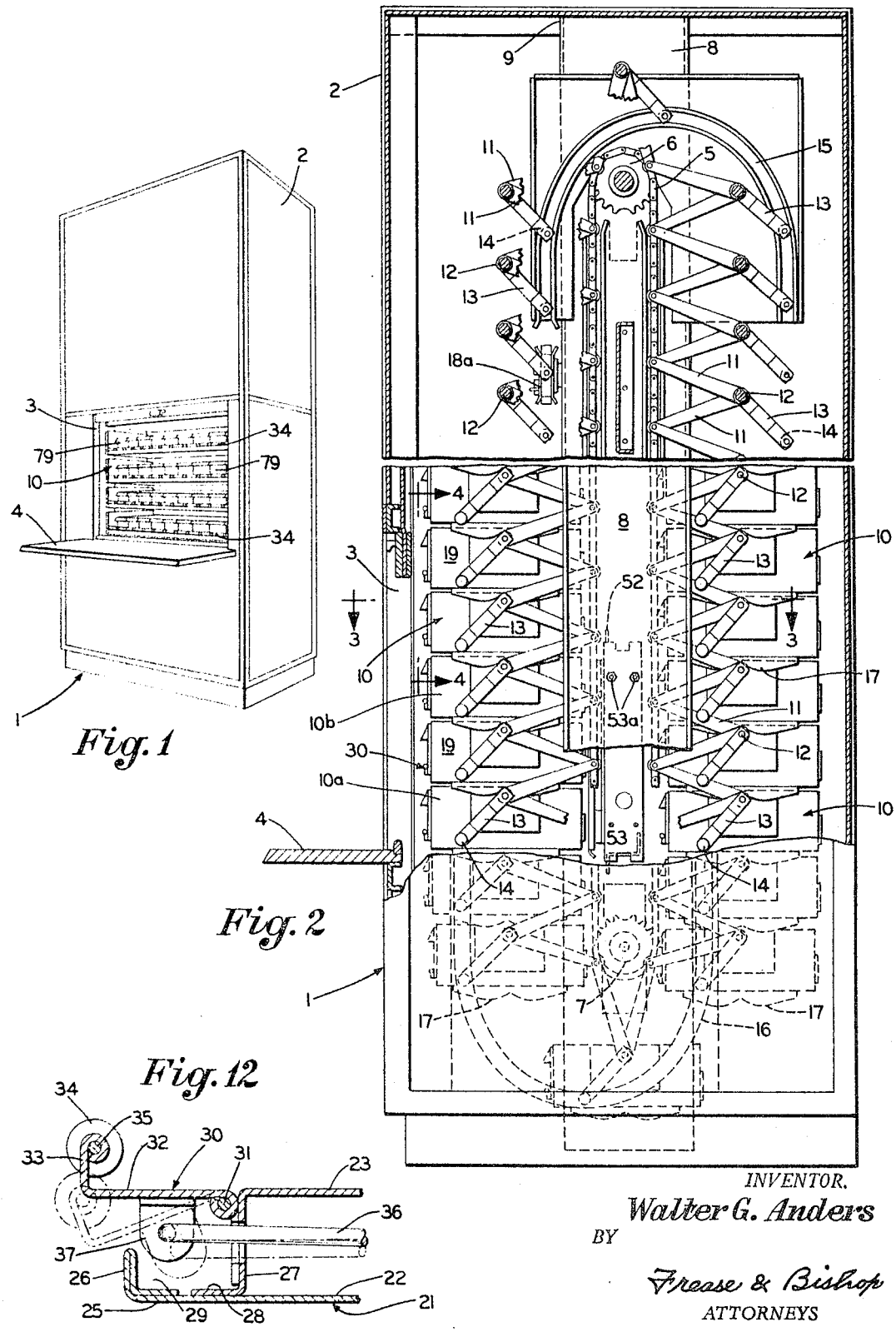

INVENTOR.
Walter G. Anders
BY
Frease & Bishop
ATTORNEYS

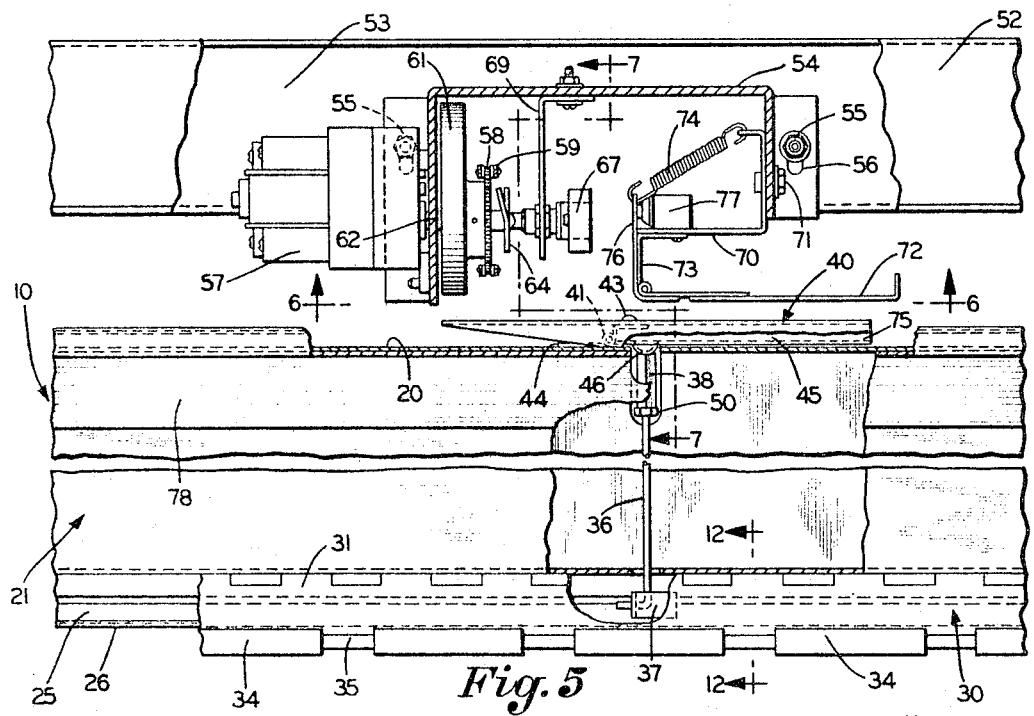

United States Patent Office 3,464,750
Patented Sept. 2, 1969

3,464,750
TRAY-RETAINER CONSTRUCTION FOR
POWER FILES
Walter G. Anders, Canton, Ohio, assignor to Diebold,
Incorporated, Canton, Ohio, a corporation of Ohio
Filed Nov. 13, 1967, Ser. No. 682,111
Int. Cl. A47f *3/08, 5/00;* A47b *49/00*
U.S. Cl. 312—268                                    16 Claims

ABSTRACT OF THE DISCLOSURE

A movable tray-retaining lip construction on each of the pans of an endless conveyor power file wherein the pans move in a continuous orbit of travel and any selected pan is stopped at a work station. The pan lip is lowered on arrival of the selected pan at the station so that any of a number of trays, normally safely held against dislodgment on the pan, may be rolled out of the pan to a work position without special suspension means for each tray on the pan. The trays seek their own storage position when moved back onto the pan and the conveyor power drive is interlocked so that the conveyor cannot be moved when any lip is out of tray-retaining position.

REFERENCE TO RELATED PATENTS

The invention comprises improvements upon power filing appliances of the general type shown in Patents Nos. 3,297,378 and 3,298,766 and in copending allowed Antram application Ser. No. 580,113 filed Sept. 16, 1966, now U.S. Patent No. 3,363,958.

BACKGROUND OF THE INVENTION

Field of the invention

The invention relates to elevator or power filing appliances of a type in which a plurality of pans are mounted on an endless conveyor for movement in either direction in a continuous orbit of travel so that any selected pan may be moved rapidly and delivered by power means to a work station; and more particularly to a construction in which a number of trays are supported on each pan without special suspension means, thus permitting any tray to be moved on or removed from its pan individually, the trays normally being safely held on their supporting pan against dislodgment during conveyor movement; and in which a lip on the front of each pan is moved down automatically upon arrival of the pan at a work station to permit any tray on the arrived pan to be rolled out of the pan and with tray movement checked against complete removal when the tray is moved to engage a work table.

Furthermore, the invention comprehends a construction in which any tray when moved rearwardly on its pan seeks its own storage position to inhibit any tray from projecting from the pan to interfere with proper conveyor movement. Finally, the invention relates to a tray-retaining construction for removable trays mounted on a power file which has a low cost and eliminates any requirements for special suspension mechanism for individual trays upon the pans in which the trays are moved during file conveyor movement.

Description of the prior art

Heretofore, in the construction and operation of power files of the type described, trays mounted on conveyor pans of the endless conveyor of the filing equipment have required special file drawer suspension mechanism for movement of the trays laterally in and out of the pans to gain access to the contents of the trays when any pan and its contained tray is delivered at a work station. Such suspension construction for movable trays has been expensive and is not particularly adapted to supporting a large number of small trays mounted and stored side by side on a single pan.

Furthermore, trays mounted on special suspension means on a conveyor pan are difficult to completely remove from the pan when it is desired to move a selected tray to a location remote from the file.

Prior constructions have been used in which individual trays are placed side by side within a pan recess of a power file pan for tray retention during conveyor movement and without special suspension means for each tray. However, even though such trays may be individually removed from the pan, removal and replacement is difficult and additional space is required between adjacent conveyor pans to permit the trays to be lifted upward out of the tray-retaining recess in the pans.

Another prior construction has been used in which a tray-retaining bar is slidably mounted on the front end of each pan movable by spring pressure laterally in one direction and vertically upwardly to tray-retaining position, and mechanically moved laterally in the other direction and vertically downwardly to tray-release position. In use, if any tray is resting on the bar without having been placed in its proper storage position in the pan and the spring pressure is greater than the weight of the tray, the portion of the tray resting on the bar will move vertically upward as the bar is moved vertically upward and, thus, may project outward of the pan and cause damage to the conveyor, pan or tray when the conveyor is moved in its orbit of travel with such an improperly located projecting tray.

SUMMARY OF THE INVENTION

Objectives of the invention include providing a low cost power file of the type described which has a plurality of trays normally stored on each of the filing appliance conveyor pans so that any tray may be moved or removed individually from its pan without special suspension means for each tray and without requiring additional head room for lifting the tray from the pan in which the tray is stored; providing a construction in which the trays normally are held safely on the pans against dislodgment; providing a construction in which the pans each have a movable front lip formed with a roller edge so that any tray may be easily rolled out of its storage position on its pan on rolls at the rear of the tray and on the lip roller edge; providing a construction in which any tray seeks its own storage position when moved rearwardly on the pan in which it is normally stored; providing a construction which checks tray movement against complete removal from a pan when pulled out of the pan at a work station; providing a construction in which the movable front pan lip moves in an arc toward and away from the front of the pan so that on lip movement toward the front of the pan to tray-retaining position, the movable lip will impart movement rearwardly on its pan in a direction toward proper storage position to any tray not in storage position on its pan; and providing a construction in which the movable lip of a selected pan moves down on arrival at a work station automatically and permits any tray on the pan to be pulled out of the tray at the work station, and which automatically prevents conveyor movement of the file when any lip on any pan exposed at an access opening of the file cabinet is out of tray-retaining position.

These objectives and advantages are obtained by the power file tray-retaining construction, the general nature of which may be stated as including in a power file of the type in which a plurality of pans is mounted on an endless conveyor carried by support means for movement in either direction in a continuous orbit of travel having at least one flight of travel in a plane extending parallel with the orbital axes and any selected pan is delivered by power means to a predetermined work station, and in which one or more trays are removably supported on each pan without special suspension means so that any tray may be moved on or removed from its pan individually; the combination of tray-retaining lip means pivotally mounted at the front edge of each pan, movable between tray-retaining and tray-releasing positions, and normally spring pressed to tray-retaining position; the lip means including a flange having a free edge located above the bottom wall of the pan when the lip means is in tray-retaining position; rollers mounted on the free edge of said lip means flange; the bottom wall of each pan slanting slightly downwardly rearwardly from the front edge of the pan; there being a downwardly rearwardly slanting wall portion forming a recess in the pan bottom wall at the corner between the pan bottom and rear walls; trays adapted to be supported on and retained in storage position on said pans; each tray having a bottom wall and roll means projecting below the bottom wall at the rear bottom corner of the tray; any tray being adapted, when the lip means is pivoted to tray-releasing position, to roll forwardly outward of its pan with the tray bottom wall rolling on said lip rollers and the tray roll means rolling on the pan botom wall to a position where tray movement is checked by engagement of the tray roll means with the lip means rollers; a lip actuator lever pivotally mounted on the rear wall of each pan; a rod adjustably connected between said lever and said lip means; motor driven cam means located between the flights of conveyor travel movable between a position engaging and a position releasing the actuator lever of any pan located at the work station; means for moving said cam means to lever-engaging position upon arrival of a selected pan at the work station; means for moving said cam means to lever-releasing position to initiate movement of said selected pan away from said work station; switch means for the controlling movement of the conveyor; a switch actuator member extending between vertical flights of the conveyor flights; said switch actuator pans in one of the conveyor flights; said switch actuator member being engageable by any one of the actuator levers on a plurality of pans accessible at an access opening in the cabinet of the filing appliance; whereby when any lip means on any of said plurality of pans accessible at the appliance access opening is out of tray-retaining position, said switch means is actuated through one of said actuator levers and said switch actuator member to a position preventing conveyor movement.

BRIEF DESCRIPTION OF THE DRAWINGS

A preferred embodiment of the invention—illustrative of the best mode in which applicant has contemplated applying the principles—is set forth in the following description and shown in the drawings, and which is particularly and distinctly pointed out and set forth in the appended claims.

FIGURE 1 is a general perspective view of a power filing appliance equipped with the new tray-retainer construction;

FIG. 2 is an enlarged side elevation with parts broken away and in vertical section at various locations, looking from the right side of FIG. 1 and showing pans in full lines in one sectional portion, and showing the mounting of the actuating mechanism for the tray-retainer construction partially in full and partially in dotted lines;

FIG. 3 is a vertical sectional view looking in the direction of the arrows 3—3, FIG. 2;

FIG. 5 is an enlarged fragmentary sectional view with parts broken away of a portion of FIG. 3, taken on the line 5—5, FIG. 6;

FIG. 9 is a view similar to a portion of FIG. 5 showing the mechanism in the position illustrated in FIG. 8;

FIG. 10 is a fragmentary enlarged sectional view looking in the direction of the arrows 10—10, FIG. 7;

FIG. 11 is a fragmentary view looking in the direction of the arrows 11—11, FIG. 10;

FIG. 12 is an enlarged fragmentary sectional view taken on the line 12—12, FIG. 5;

FIG. 13 is an enlarged sectional view through the conveyor illustrating a pan just after delivery to the work station; and FIG. 14 is a view similar to FIG. 13 illustrating a tray moved from the position of FIG. 13 outwardly with the front end of the tray resting on a work table at the work station.

Similar numerals refer to similar parts throughout the drawings.

DESCRIPTION OF THE PREFERRED EMBODIMENT

Figure 4:
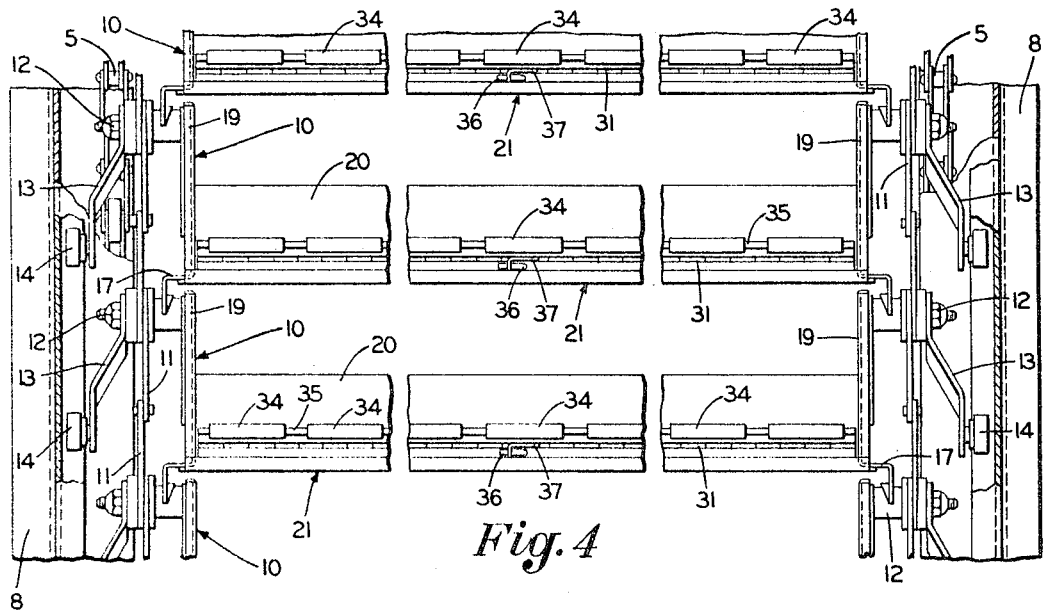
FIG. 4 is a fragmentary side elevational view with parts broken away and in section illustrating several of the pans on the conveyor looking toward the left side of the middle portion of the file in the direction of the arrows 4—4, FIG. 2.

The improved tray-retainer construction for power files is ilustrated and described in the drawings in connection with a power file of the general type shown in Patents Nos. 3,297,378 and 3,298,766 wherein the new tray-retainer construction and the actuating mechanism therefor replaces the ejector construction shown in said patents. Furthermore, the improved tray-retainer construction of a present invention may be controlled and actuated by the power file level control means shown in copending Antram application Ser. No. 580,113.

A power file is generally indicated at 1 and may include a housing or cabinet 2, the front wall of which may be provided with an access opening 3 above a counter or work station 4. A pair of conveyor chains 5 trained over sprockets 6 and 7 mounted on upright support members 8 carried at 9 within housing 2 mount a series of pans 10 for movement in either direction in a continuous orbit of travel. As shown, the pan movement is in vertical flights between sprockets 6 and 7. Each pan 10 is mounted at each end on a pair of arms 11 fixed to a chain 5, and arms 11 pivotally support an end of a pan 10 at 12. A stabilizing arm 13 is fixed to each end of each pan 10 having a roller 14 at its outer end. Rollers 14 engage and are guided in movement around the upper and lower ends of the path of conveyor travel by curved guide channels 15 and 16 to maintain pans 10 in a horizontal position throughout the upper and lower ends of the orbit of travel on conveyor chains 5 when traveling around sprockets 6 and 7. Horizontal positioning of pans 10 is maintained during travel in the vertical flights between sprockets 6 and 7 by engagement of a V-ear 17 at each end of one pan with the pivot means 12 of the pan next below.

Conveyor 5 is driven in a suitable manner from a drive motor 18 which may be a reversing motor, operated preferably by selector switches and a rotary selector control switch, not shown, of a type such as shown in Patent No. 3,198,894. The construction and operation of the conveyor, housing, etc., thus briefly described herein may be of the type shown in Patent No. 3,199,658. The level positioning of any pan delivered to the work station may be controlled by level controller mechanism such as shown in said application Ser. No. 580,113 which may include the level switch generally indicated at 18a in FIG. 2.

Power files of the type shown comprise a plurality of pans mounted on an endless conveyor for movement in either direction in a continuous orbit of travel. Any selected pan is delivered by power operation of the conveyor to a location opposite the work station 4. When delivered opposite such work station, a tray or trays on the pan may be moved between retracted and extended positions and where each pan contains a plurality of removable trays, the trays may be moved outward from the pan at the work station 4 or may be removed from the pan at the work station. In accordance with the invention, a movable lip mechanism is mounted at the front edge 25 of each pan 10 to retain the trays in the pan when the lip is in one or tray-retaining position and to permit the trays to be rolled out of the pan when the lip is in another or tray-releasing position.

In accordance with the invention, each pan 10 has end walls 19 on which the pan pivot supports 12 are mounted and from which the V-ears 17 extend, a pan rear wall 20 and a box-like bottom wall generally indicated at 21. The bottom wall 21 preferably is formed with a bottom member 22, a top member 23, a channel reinforcing member 24 (FIG. 13) extending lengthwise thereof and a reinforced front edge 25 terminating in upturned flange 26 (FIG. 12). The top member 23 of the bottom wall preferably terminates in a downturned flange 27 and an outturned flange 28 connected with the bottom member 22, as shown in FIG. 12, thereby forming an upwardly opening channel 29 at the front edge of the box-like pan bottom wall 21.

A lip member 30, L-shaped in cross section, is pivotally mounted on hinge means 31 on bottom wall flange 27. The hinge means 31 preferably includes torsion spring means in its hinge pin urging the member 30 to normal position shown in full lines in FIG. 12 when the long leg 32 of the L-shaped member 30 forms a continuation of the top member 23 of pan bottom wall 21. When member 30 is in normal position, its short leg 33 projects upward with its free edge located above the plane of top member 23, and a series of rollers 34 are pivotally mounted at 35 at the free edge of lip member leg 33. Lip member 30 is shown in full lines in FIG. 12 in tray-retaining position and is shown in dot-dash lines in retracted or tray-releasing position. Member 30 may be moved between tray-retaining and tray-releasing positions by movement of an actuator rod 36 connected with an ear 37 mounted on member 30. Rod 36 extends rearwardly of pan 10 through the box-like bottom wall 21 between bottom and top members 22 and 23 (FIGS. 5, 7, 8, 12, 13 and 14) and the rear end of rod 36 (FIG. 10) is adjustably connected with turnbuckle sleeve 38 by a screw portion 39.

An actuator lever 40 is pivotally mounted on a hinge 41 on the rear wall 20 of each pan, hinge strap 42 being secured to the actuator lever 40 by bolts 43 and hinge strap 44 being secured in any suitable manner as by spot-welding to the rear wall 20 of each pan 10 (FIG. 11) Actuator lever 40 is provided with an offset downturned ear 45 (FIGS. 7, 8, 10 and 11) formed with a hemispherical recess 46 which receives a bushing 47 in which the heat 48 of a screw 49 is seated, the screw 49 being connected to turnbuckle sleeve 38. Turnbuckle sleeve 38 and its locknut 50 (FIG. 10) may be adjusted to properly position the actuator lever 40 through lip actuator rod 36 with the L-shaped lip 30 controlled by the actuator lever.

Recess 46 is provided with an elongated opening 51 (FIG. 11) through which screw 49 extends to permit tilting movement of actuator lever 40 with respect to the head 48 of adjusting screw 49. Bushing 47 preferably is formed from nylon to provide for universal movement at the joint in the hemispherical recess 46 (FIG. 10).

Figures 6, 7, 8:
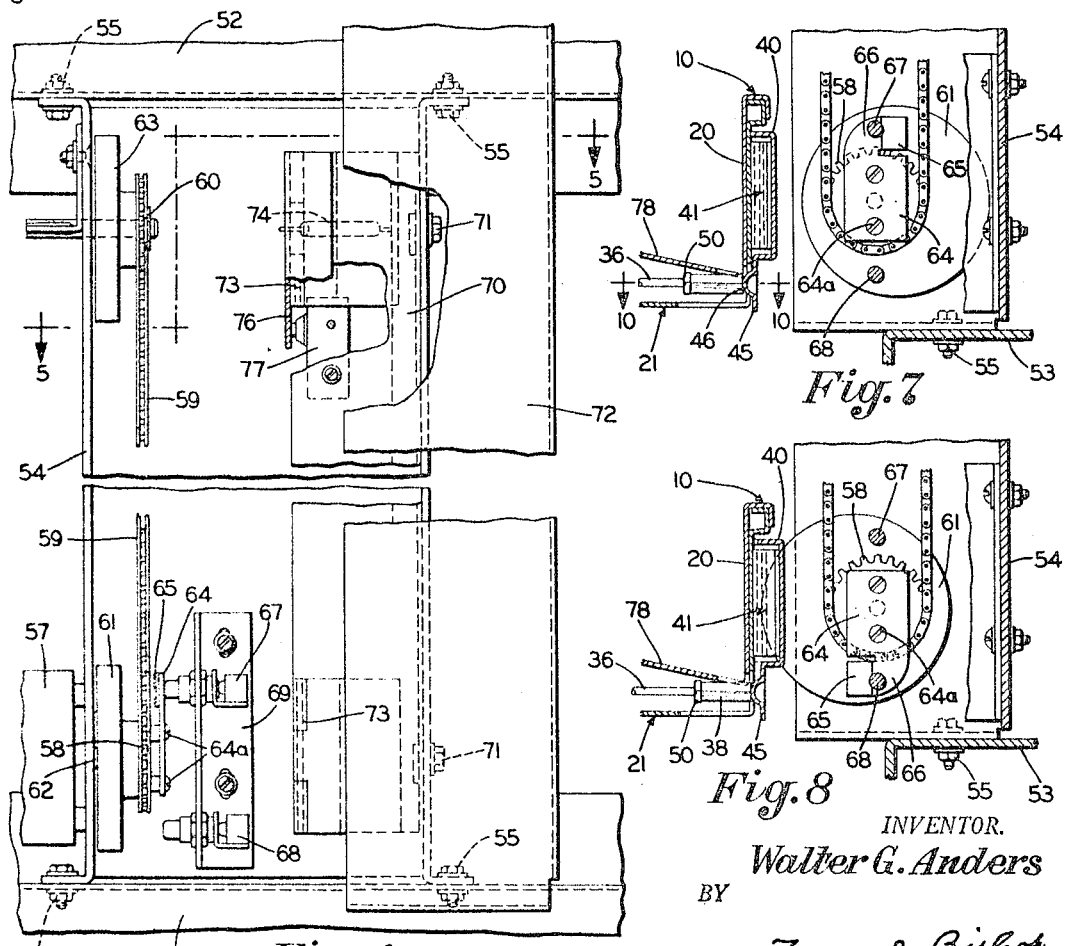
FIG. 6 is a fragmentary elevational view looking in the direction of the arrows 6—6, FIG. 5, with parts broken away.
FIG. 7 is a fragmentary sectional view taken on the line 7—7, FIG. 5.
FIG. 8 is a view similar to FIG. 7 illustrating portions of the pan-retainer actuating mechanism in a different position than shown in FIG. 7.

Angular upper and lower stretcher members 52 and 53 are mounted at their ends by bolts 53a to support members 8. Members 52 and 53 extend between the two spaced support members 8 and between the two vertical flights of conveyor travel, opposite the location of the opening 3 in the front wall of cabinet 2 (FIGS. 2, 3, and 6). An actuator support channel 54 (FIG. 9) is mounted by bolts 55 on and between the stretcher members 52 and 53 (FIG. 6) extending vertically between the flights of conveyor travel and the stretcher members 52 and 53. The location of support channel 54 laterally with respect to actuator levers 40 (FIGS. 5 and 9) may be adjusted by the slotted connection 56 in the support channel 54 through which the bolts 55 extend.

An actuator motor 57 is mounted on support channel 54 driving a lower sprocket 58, a chain 59 and an upper idler sprocket 60 also journalled on support channel 54 (FIGS. 5, 6, 7, 8, 13 and 14). An eccentric cam 61 is journalled on motor shaft 62 (FIGS. 13 and 14) and a similar cam 63 is journalled on the shaft of upper sprocket 60 (FIG. 6). Motor shaft 62 also has a switch actuator plate 64 mounted thereon by bolts 64a (FIG. 6) on the side of sprocket 58 opposite cam 61.

Plate 64 has a slanted ear 65 formed on its projecting end 66 adapted for selective engagement alternately with switches 67 and 68 alternately with each half revolution of sprocket 58 and cam 61. The switches 67 and 68 are mounted on a bracket 69 on channel 54. Plate 64 engages and actuates switch 67 when cam 61 is out of engagement with actuator lever 40 (FIGS. 5 and 7), and plate 64 engages and actuates switch 68 when cam 61 is in the position shown in FIGS. 8 and 9 in engagement with actuator lever 40.

Cam 63 through chain drive 59 operates in unison with cam 61 (FIG. 6) but is at a location spaced above cam 61 adjacent one of the pans 10 above the particular pan stopped at or located at the work station counter 4. For example, cam 63 may be located at the rear of the pan 10b (FIG. 2) which may be the second pan above pan 10a located at work station 4.

In other words, the lip means 30 for each of pans 10a and 10b will be moved to released position with the mechanism illustrated in FIGS. 2 and 6 wherein cam 63 is coordinated with cam 61 by chain 59.

The purpose of providing for release of two different pan members at the work station is to enable the improved tray retainer construction to be used on power files having a counter at the work station movable to two different positions as disclosed in Patent No. 3,224,825.

A vertical L-shaped bracket 70 is mounted by bolts 71 on actuator support channel 54 (FIGS. 5, 6 and 9). A safety control member 72 is pivotally mounted on hinge means 73 on bracket 70. Safety control member 72 extends vertically between the vertical flights of the conveyor and at the rear of the pans 10 in the conveyor flight which passes the front wall access opening 3.

As shown in FIG. 6, safety control member 72 preferably extends upward beyond stretcher member 52 to a location behind all four of those pans 10 shown in FIG. 2 which are located opposite the access opening 3 when the conveyor is stopped.

Safety control member 72 preferably is urged by spring 74 to the position shown in FIG. 5. Whenever any one of the actuator levers 40 of any pan 10 located adjacent the safety control member 72 is moved to a position (FIG. 9) which releases any lip 30 of any such pan 10 to release position shown in dot-dash lines in FIG. 12, the heel-end 75 of actuator lever 40 engages safety control member 72 and pivots member 72 counterclockwise to the position shown in FIG. 9. Safety control member 72 has a leg 76 which engages and actuates a switch 77 also mounted on L-shaped bracket 70.

Switch 77 is in "off" or circuit interrupting position when control lever 72 is engaged and moved to the position of FIG. 9 by any actuator lever 40. When lever 72 is in normal position of FIG. 5, switch 77 is in "on" or circuit making position.

In this manner when the lip 30 of any pan 10 accessible at the work station 4 is moved to release position either manually or by operation of one of the cams 61 or 63, the lip actuator lever 40 is moved to the position of FIG. 9, thus moving switch 77 to "off" or circuit interrupting position.

Switch 77 is in the control circuit which also includes level switch 18a that controls operation of conveyor motor 18, so that when any lip 30 of any pan 10 is out of tray retaining position, operation of the conveyor drive motor 18 is prevented.

The pan bottom wall 21 and particularly the top member 23 thereof preferably is slanted slightly downwardly rearwardly from the front of the pan toward the pan rear wall 20 (FIG. 13). Near the pan rear wall 20, pan top member 23 is downwardly rearwardly slanted at 78 to form a recess in the pan bottom wall at the corner between the pan bottom and rear walls.

Each pan 10 is adapted to receive a series of trays 79 side by side as shown in FIG. 1. One of the trays 79 is illustrated in FIGS. 13 and 14. Each tray 79 has a bottom wall 80 which is equipped with roll means 81 projecting below bottom wall 80 at the rear bottom corner of tray 79.

The pan-retaining lip means 30 is in retaining position in FIG. 13 and as shown in full lines in FIG. 12. Trays 79 are retained by the thus positioned lip 30. At this time the roll means 81 on trays 79 are received within pan recesses 78.

When pan-retaining lip means 30 is in release position (FIG. 14) as shown in dot-dash lines in FIG. 12, any tray 79 on pan 10 may be readily rolled out to rest on work counter 4 as shown in FIG. 14.

Tray 79 in moving on the pan 10 rolls on the lip rollers 34 and tray roll means 81 roll on the top member 23 of the pan bottom wall. As any tray 79 approaches the position shown in FIG. 14, further rolling movement is checked by engagement of the tray roll means 81 with the lip means rollers 34, as shown.

Any tray 79 may be lifted from the rolled-out position shown in FIG. 14 and moved to another location if desired. Thus, trays 79 are completely removable from the storage pans on which they are stored and retained. As a tray 79 is moved on its storage pan 10 to retained or storage position, it rolls on its roll means 81 and on the lip rollers 34. Since the entire pan bottom wall 21 is slightly tilted rearwardly as described, this movement is normally free-rolling and rolling movement has the tendency to continue.

As any tray 79 approaches the proper roll storage position shown in FIG. 13, the tray roll means 81 roll downward into recesses 78 so that means thus is provided by which any tray seeks its final and proper storage position when moved rearwardly on the pan in which it is stored.

When a number of trays 79 are arranged and located side by side in storage position on any pan 10, as shown in FIG. 1, the trays should be generally guided for proper movement from front to rear without skewing. Thus, guide flanges 82 (FIG. 3) may be provided on each pan 10 to properly laterally space the trays with sufficient clearance between trays.

Since the trays 79 may have various widths to accommodate various sized cards or files of card files or other similar files, the guide flanges 82 preferably are adjustable on the pans 10. Any tray 79 may have its movement impeded slightly when moving it rearwardly on a pan 10 to storage position, either by frictional engagement with adjacent trays, or by some skewing, so that the tray 79 may not quite reach "home" or storage position when manually replaced. This condition is overcome by the movement of lip means 30 in moving from release position of FIG. 14 to retaining position of FIG. 13.

Thus, lip 30 moves in an arc toward the front wall of any tray 79 and imparts rearward movement to any tray 79 which has not reached "home" position to drive it home. This particular feature of the improved mechanism is a distinct advantage over prior structures wherein a tray-retaining lip moves vertically. In such prior structures if a tray is not in "home" position but rests on the lip, it is moved upward by the vertically moving lip but is not moved to proper storage position and can cause damage to the conveyor mechanism.

The improved construction combines a number of important aspects or concepts. The actuator mechanism for the retaining lip mechanism for trays on pans, as well as the safety mechanism cooperatively engaged with the lip actuating mechanism, is located between the flights of travel of the power file and thus does not require additional or otherwise usable space. This is of advantage and importance not only from the standpoint of space saving, but also by removing any such actuating and safety mechanism from the cabinet structure or the front of the pans located at the work station or in and around the access opening at the work station.

Furthermore, the pivoted retractable lip mechanism with its roller edge not only provides for ease of tray movement on the pans upon roll means, but provides positive movement from the retaining means to the trays to assure that the trays are moved to "home" or proper storage position.

Furthermore, the improved structure is fundamentally quite simple in construction and operation and is easy to use and inexpensive to incorporate in a power file structure. It is likewise adaptable to tray structures of various sizes which may be housed, stored and moved on the file pans.

The improved construction accordingly provides an effective and inexpensive mechanism for safely housing and retaining movable and removable trays on the pans of a power file, and achieves the described objectives, solves needs existing in the art, and obtains the new results described in a simple and inexpensive manner.

In the foregoing description certain terms have been used for brevity, clearness and understanding; but no unnecessary limitations are to be implied therefrom beyond the requirements of the prior art because such terms are used for descriptive purposes and are intended to be broadly construed.

Moreover, the description and illustration of the invention is by way of example, and the scope of the invention is not limited to the exact structures shown and described.

I claim:

1. Tray-retainer construction for the pans of a power file of the type in which a plurality of pans is mounted on an endless conveyor mechanism carried by support means for movement in either direction in a continuous orbit of travel having at least one flight of travel in a plane extending parallel with the orbital axes and any selected pan is delivered by conveyor drive power means to a predetermined work station location, in which movable trays are supported directly on each pan in storage position and are adapted when any selected pan is at said predetermined work station location to be moved relative to and removed from such pan through a file access opening provided in the file case at said work station location; the construction including in combination, each pan having bottom and rear walls, tray-retaining lip means pivotally mounted at the front edge of each pan for movement between the retaining and release positions provided with an upstanding flange having a free edge normally projecting above the pan bottom wall when the lip means is in retaining position and movable outwardly downwardly of the bottom wall to release position; means normally urging the lip means to tray-retaining position; lip means actuator mechanism mounted on each pan connected with the lip means and having an actuator lever mounted on the rear wall of each pan; and motor driven means mounted on the conveyor support means located between the conveyor flights engageable with the actuator lever of any pan located at the work station to move the lip means of such pan from retaining to release position.

2. The construction defined in claim 1 in which the lip means comprises an L-shaped member having a leg projecting from said upstanding flange, and hinge means connecting said leg and the pan, said hinge means forming the pivotal mounting of the lip means on the pan.

3. The construction defined in claim 2 in which the hinge means includes torsion spring means providing the means normally urging the lip means to tray-retaining position.

4. The construction defined in claim 1 in which rollers are mounted on the free edge of said lip flange, and in which any tray upon moving such tray on the pan when the lip means is in release position may roll on said rollers.

5. The construction defined in claim 1 in which each tray has a rear bottom corner, and in which each tray is provided with roll means at its rear bottom corner adapted to roll on the pan bottom wall when such tray is moved on such pan.

6. The construction defined in claim 1 in which rollers are mounted on the free edge of the lip flange, in which each tray has a rear bottom corner, in which roll means are mounted on each tray at the rear bottom corner, in which the tray rolls on the rollers and the tray roll means roll on the pan bottom wall when a tray is moved on the pan, and in which the tray roll means engage the pan rollers to check movement of any tray as such tray is being moved on its pan.

7. The construction defined in claim 6 in which the bottom wall of each pan slants slightly downwardly rearwardly from the front edge of the pan, whereby any tray tends to roll toward the pan rear wall when pushed on its pan.

8. The construction defined in claim 6 in which the pan bottom wall is formed with a downwardly rearwardly slanting wall portion providing a recess at the corner between the pan bottom and rear walls, and in which the tray roll means seeks to move into said corner to storage position when any tray approaches the pan rear wall upon being pushed on its pan.

9. The construction defined in claim 4 in which each tray has a front wall, and in which the pan rollers engage the tray front wall of any tray not in storage position and push the tray rearwardly of the pan when the lip means moves from release to retaining position.

10. The construction defined in claim 1 in which the lip means actuator mechanism includes rod means extending along the pan bottom wall connected with the actuator lever and the lip means, in which the actuator lever is in normal position when the lip means is in retaining position, and in which movement of the lever out of normal position moves the lip means to release position through said rod means connection.

11. The construction defined in claim 10 in which universal joint means is provided at the connection between the rod means and actuator lever.

12. The construction defined in claim 10 in which the rod means is adjustably connected with the actuator lever.

13. The construction defined in claim 1 in which said motor-driven means located between the conveyor flights includes a rotatable cam movable between a position engageable with and a position disengaged from the actuator lever of any pan located at the work station.

14. The construction defined in claim 1 in which the motor-driven means located between the conveyor flights includes a plurality of similar cams spaced apart and movable between positions engaged and disengaged simultaneously with the actuator levers of a first pan located at the work station and a second pan on the conveyor spaced above said first pan, and in which said plurality of cams are driven synchronously by said motor-driven means.

15. The construction defined in claim 1 in which safety control means is mounted on said power file support means between the conveyor flights, and in which said safety control means is actuated to de-energize the conveyor drive power means by the actuator lever of any pan accessible at the access opening whose lip means is in release position.

16. The construction defined in claim 1 in which safety control means is mounted on said power file support means between the conveyor flights, in which said safety control means includes a member pivotally mounted on said support means extending vertically at the rear of all conveyor flight pans which are opposite the access opening, in which the safety control means includes switch means adapted to be engaged by said pivoted safety control member, in which said safety control member is engaged by the lip means actuator lever of any pan accessible at the access opening whose lip means is in release position, and in which said switch means de-energizes the conveyor drive power means when the switch means is engaged by said safety control member.

References Cited

UNITED STATES PATENTS

| | | | |
|---|---|---|---|
| 3,166,366 | 1/1965 | Krug et al. | 312—223 |
| 3,235,319 | 2/1966 | Anders et al. | 312—223 |
| 3,236,577 | 2/1966 | Anders et al. | 312—223 |
| 3,292,986 | 12/1966 | Fenwick | 312—333 |
| 3,297,378 | 1/1967 | Krug et al. | 312—223 |
| 3,298,766 | 1/1967 | Graber et al. | 312—223 |
| 3,306,691 | 2/1967 | Graber et al. | 312—223 |
| 3,345,117 | 10/1967 | Goldammer et al. | 312—223 |

JAMES T. McCALL, Primary Examiner

U.S. Cl. X.R.

312—223, 333